United States Patent [19]

Leyen et al.

[11] Patent Number: 5,701,338
[45] Date of Patent: Dec. 23, 1997

[54] CALL BOX WITH KEYBOARD COMMUNICATION

[75] Inventors: Thomas Leyen, Byron; Ronald Sheldrup, Menlo Park; Warren Burks, San Anselmo; Moises Macias, San Francisco, all of Calif.

[73] Assignee: DNB Dataware Sciences, Inc. Technologies, Barbados, Barbados

[21] Appl. No.: 419,662

[22] Filed: Apr. 11, 1995

[51] Int. Cl.$^6$ .......................... H04M 11/04; H04M 11/00; H04M 17/00; H04B 17/00
[52] U.S. Cl. ............................... 379/58; 379/45; 379/52; 379/37; 379/155; 455/67.7
[58] Field of Search .......................... 379/52, 56, 57, 379/58, 59, 96, 182, 45, 155, 37; 434/111; D14/144; 220/36; 317/120; 445/127; 235/1 D

[56] References Cited

U.S. PATENT DOCUMENTS

| | | | |
|---|---|---|---|
| 3,749,982 | 7/1973 | Derdzinski et al. | 317/120 |
| 4,503,288 | 3/1985 | Kessler | 179/2 |
| 4,703,161 | 10/1987 | McLean | 234/1 D |
| 4,727,538 | 2/1988 | Farrell | 379/45 |
| 4,783,800 | 11/1988 | Levine | 379/67 |
| 4,788,711 | 11/1988 | Nasco, Jr. | 379/59 |
| 4,817,126 | 3/1989 | Hendershot | 379/58 |
| 4,903,290 | 2/1990 | King | 379/155 |
| 4,903,323 | 2/1990 | Hendershot | 455/67.7 |
| 4,974,257 | 11/1990 | Ibanez | 379/143 |
| 4,991,197 | 2/1991 | Morris | 379/58 |
| 5,148,471 | 9/1992 | Metroka et al. | 379/58 |
| 5,155,689 | 10/1992 | Wortham | 364/460 |
| 5,189,632 | 2/1993 | Paajanen et al. | 379/110 |
| 5,272,747 | 12/1993 | Meads | 379/59 |
| 5,297,196 | 3/1994 | Yamada | 379/99 |
| 5,311,175 | 5/1994 | Waldman | 341/34 |
| 5,325,418 | 6/1994 | McGregor | 379/59 |
| 5,333,177 | 7/1994 | Braitberg | 379/59 |
| 5,337,343 | 8/1994 | Stickney | 379/45 |
| 5,365,570 | 11/1994 | Boubelik | 379/59 |
| 5,377,256 | 12/1994 | Franklin et al. | 379/45 |
| 5,450,470 | 9/1995 | Alheim | 379/52 |
| 5,511,234 | 4/1996 | Ha | 455/127 |
| 5,526,411 | 6/1996 | Krieter | 379/110 |
| 5,598,460 | 1/1997 | Tendler | 379/45 |

*Primary Examiner*—Curtis Kuntz
*Assistant Examiner*—Binh K. Tieu
*Attorney, Agent, or Firm*—William Michael Hynes; Townsend and Townsend and Crew, LLP

[57] ABSTRACT

A keyboard and attached interface for a conventional call box is disclosed. The interface constitutes an interrupt between the cellular telephone handset and cellular transceiver which is activated either by a conventional keypad "On" switch or in conjunction with the telephone hook switch. The TDD keyboard is contained within the call box behind its own discrete door where interference with conventional voice communication cannot occur. Upon opening of the keyboard door, the keyboard activates an interactive display which scrolls status messages to the user informing him of call status upon activation of the keyboard. Switching from voice to keyboard communication is enabled until the answering dispatch center interrogates the call box for identity and necessarily location. Assuming that keyboard communication is selected, necessary communication delay is accepted until communication with a TDD capable dispatcher is established. The keypad is of standard layout and is simply altered for rapid emergency communication including "Yes" and "No" questions typically asked pursuant to a conventional decision tree for rapid screening of the situation attendant the caller. Provision made to customize the interface to the cellular telephone environment include enabling transmission to continue despite line interruptions and providing a switched filter to enhance attached modem transmission. Call termination is dispatch center actuated. There is provided a simple TDD interface which is both a service to the hearing impaired as well as providing superior communication in high noise environments.

7 Claims, 18 Drawing Sheets

| FIG. 4B-1 | FIG. 4B-2 | FIG. 4B-3 | FIG. 4B-4 |
| --- | --- | --- | --- |
| FIG. 4B-5 | FIG. 4B-6 | FIG. 4B-7 | FIG. 4B-8 |

CALL BOX WITH KEYBOARD COMMUNICATION

This invention relates to a call box having an attached keyboard for emergency use by the hearing impaired or alternately for high noise environments, such as freeways with sound walls. In particular, the disclosed keyboard constitutes a transparent interface to a call box cellular telephone which interacts with the call box and the answering dispatch center to optimize both the user and dispatcher keyboard communication.

BACKGROUND OF THE INVENTION

It is well known for the hearing impaired to utilize keyboards through an attached modem for communication over a sound linked telephone handset. In such an application, the keyboard communicates directly to a portable acoustical modem having a handset cradle. The acoustical modem then has input to the telephone handset. Communication with another keyboard can follow.

Call boxes are known. Generally, such call boxes are cellular telephones powered by solar charged batteries and rest in a dormant state at a road side. Upon being approached for use, such telephones power up and place a cellular telephone call to a pre-programmed number. When the cellular telephone call is placed, such telephones are interactive with a dispatch center for verifying location, status, periodic reporting, and most importantly initiating emergency telephone calls by the public.

To date, such call boxes have not been provided with Telecommunications Devices for the Deaf (TDD) or Text Telephone (TT) capability. In what follows, there is disclosed an interactive protocol which enables an interface to be transparently utilized by existing call boxes and to interactively cooperate with an answering dispatch center.

SUMMARY OF THE INVENTION

A keyboard and attached interface for a conventional call box is disclosed. The interface constitutes an interrupt between the cellular telephone handset and cellular transceiver which is activated either by a conventional keyboard "On" switch or in conjunction with the telephone hook switch. The TDD keyboard is contained within the call box behind its own discrete door where interference with conventional voice communication cannot occur. Upon opening of the keyboard door, the keyboard activates LEDs and an interactive display which scrolls status messages to the user informing him of call status upon activation of the keyboard. Switching from voice to keyboard communication is enabled until the answering dispatch center interrogates the call box for identity and necessarily location. Assuming that keyboard communication is selected, necessary communication delay is accepted until communication with a TDD capable dispatcher is established. The keypad is designed for rapid emergency communication including "Yes" and "No" questions typically asked pursuant to a conventional decision tree for rapid screening of the situation attendant the caller. Provision made to customize the interface to the cellular telephone environment include enabling transmission to continue despite line interruptions and providing a switched filter to enhance attached modem transmission. Call termination is dispatch center actuated. There is provided a simple TDD interface which is both a service to the hearing impaired as well as providing superior communication in high noise environments.

DESCRIPTION OF THE PREFERRED EMBODIMENT

Figure 1:
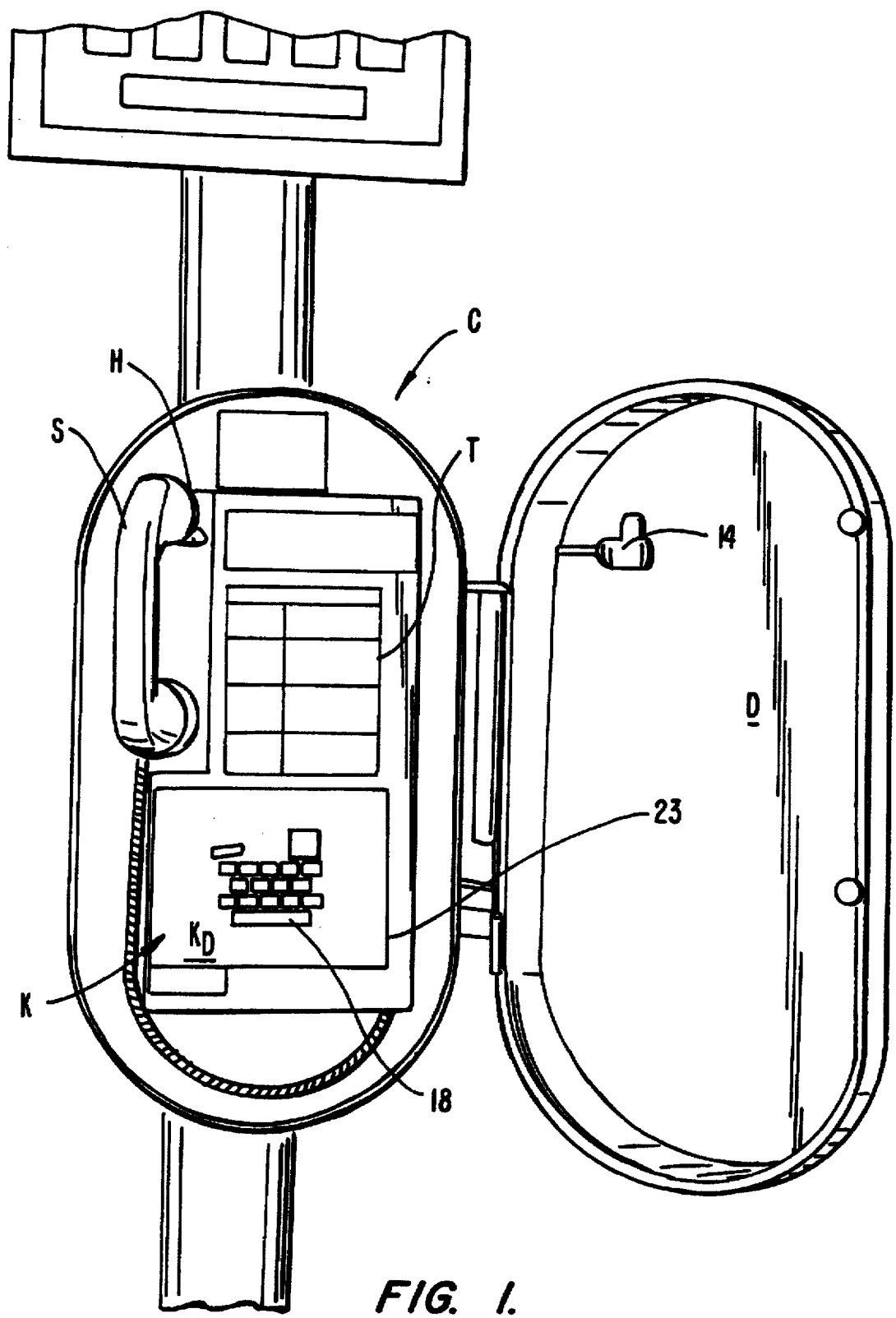
FIG. 1 is a perspective view of a call box with the door open to expose the interior Telecommunication Device for the Deaf (TDD)

Referring to FIG. 1, call box C is illustrated with box door D illustrated in the open position. In the opening of box door D, magnetic switch 14 has caused contained cellular transceiver T to move from the so-called "sleep" state to a power up state preparatory to call placement.

With box door D in the open position, keyboard communication device K (hereafter referred to as keyboard K) is exposed with its keyboard door $K_D$ in the closed position. This keypad P is a well known membrane type keypad suitable for emergency use in a harsh environment. For an unmistakable indication of its contents, keyboard door $K_D$ has an abbreviated relief keyboard 18 on the exterior thereof. Keyboard door $K_D$ swings on hinge 23 in such a manner that interference with box door D to close keyboard door $K_D$ occurs whenever box door D is closed.

Call box C includes handset H which in turn hangs on hook switch S. As will hereafter become more apparent, keyboard K can be activated whether or not handset H is on hook switch S. This function is required because hearing impaired users are accustomed to having the handsets of telephones removed for TDD communication; reversing of this procedure in emergency situations would have an operational feature contrary to acquired practice or habit.

Figure 2:
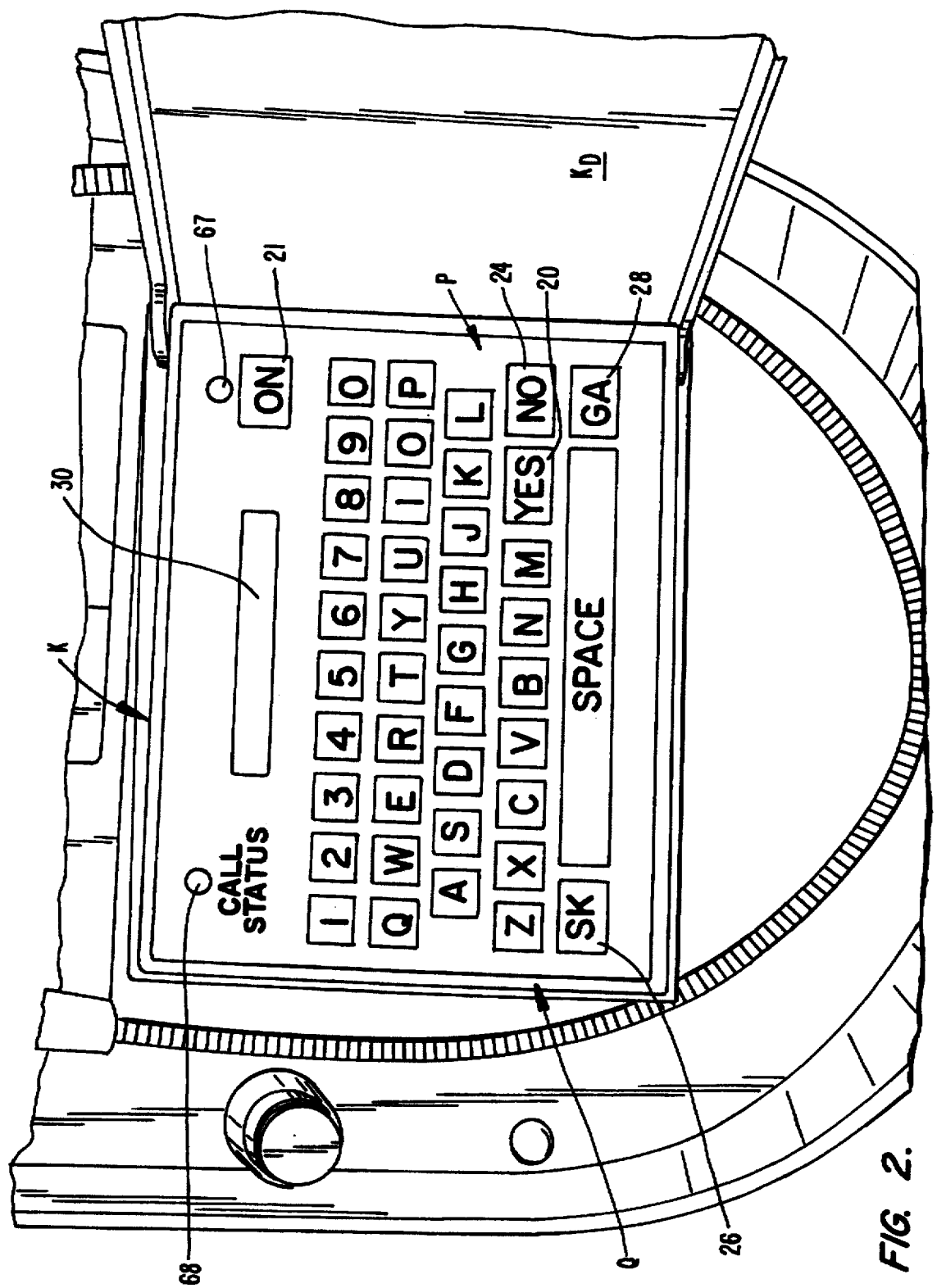
FIG. 2 is a perspective view of the TDD keyboard when the keyboard door is opened.

Referring to FIG. 2, keyboard K is shown with keyboard door $K_D$ open exposing keypad P. Keypad P includes so-called QWERTY keyboard Q having four notable exceptions.

First, keypad K includes "ON" switch 21. This switch toggles keyboard K into and out of switching interrupt with handset H on hook switch S. When keyboard K is in operation, handset H is inoperative; when handset H is in operation, keyboard K is inoperative. As will hereafter be developed, such switching choice between respective keyboard K and handset H is enabled until cellular transceiver T is interrogated for identity and necessarily location when a call is first answered.

Second, keypad P includes "Yes" key 20 and "No" key 22. These respective keys 20, 22 enable rapid user response to TDD dispatcher originated questions following a decision tree type questionnaire such as: "Is this an emergency?"; "Is anyone injured?"; "Is a car on the road?", etc. Stopped keying (SK) key 26 and go ahead (GA) 28 switches are provided to facilitate communication as these are standard TDD abbreviations.

Third, punctuation marks such as commas, dashes, etc. have been eliminated to allow for a larger sized keys on the keypad. The keypad design is unique to an QWERTY style keypad available.

Finally, a 16 character vacuum fluorescent display 30 is provided for the scrolled display of messages while keyboard K is in use. As will hereafter be developed, this display gives the user indications of call status, broadcasts visually received text to the user, and repeats transmitted text for a view as sent of transmitted messages.

Figure 3A:
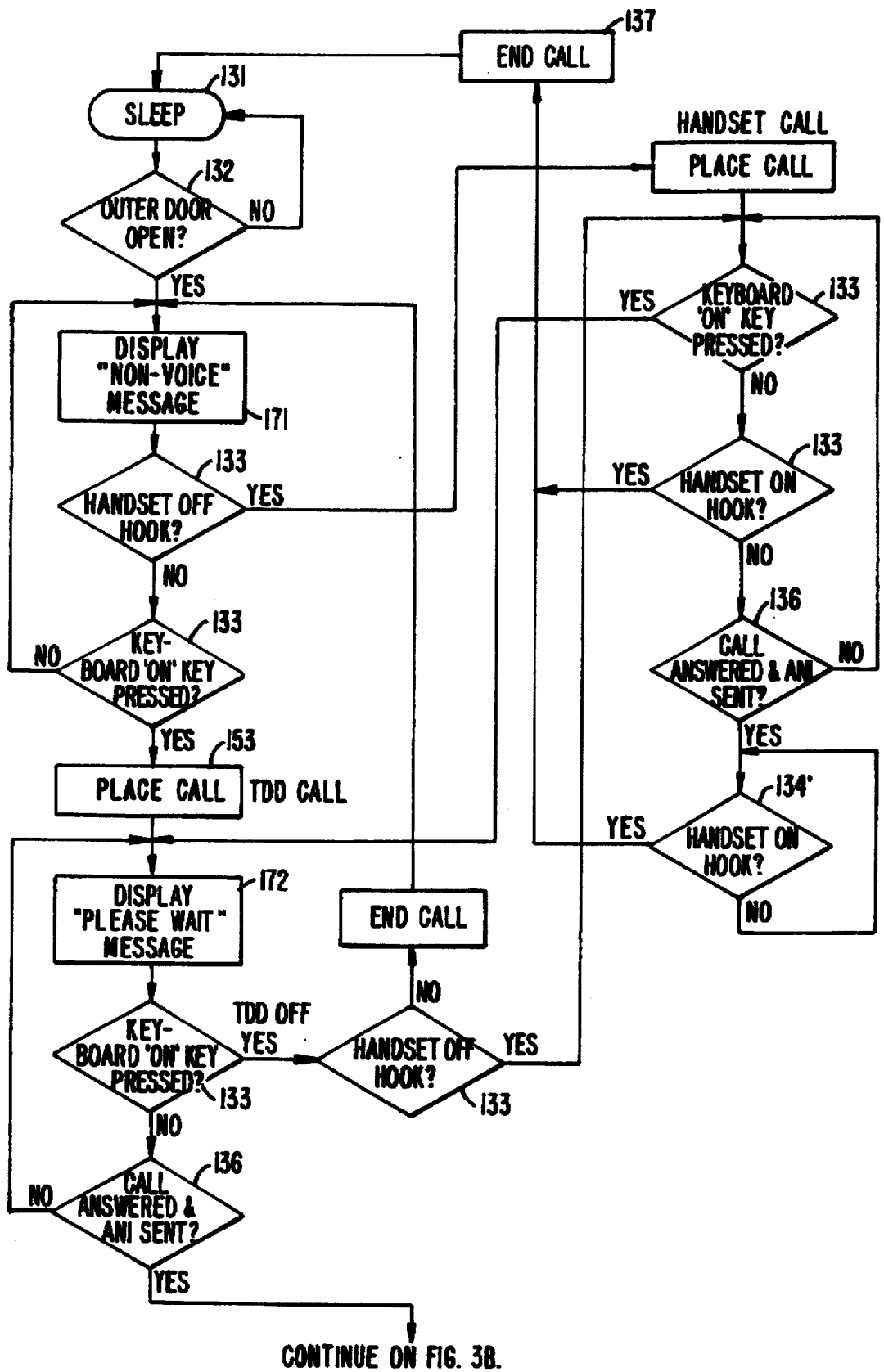
FIG. 3A and 3B are block diagrams illustrating call box status and messages displayed during initiation of a TDD call to a dispatch center; and, FIG. 4A and 4B illustrated the hardware of the call box interface utilized with the keyboard of this invention.
Figure 3B:
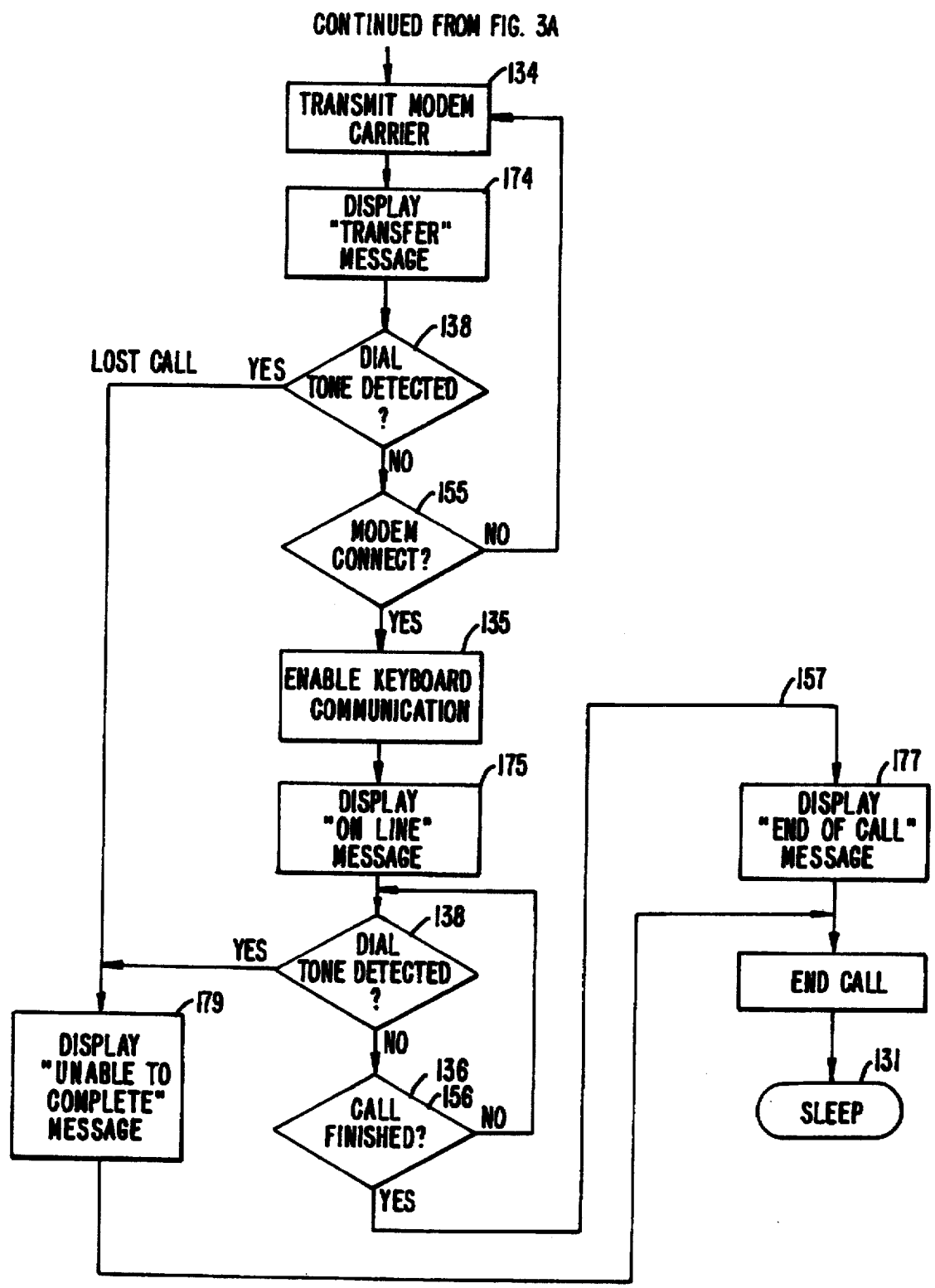
Figures 1, 4A:
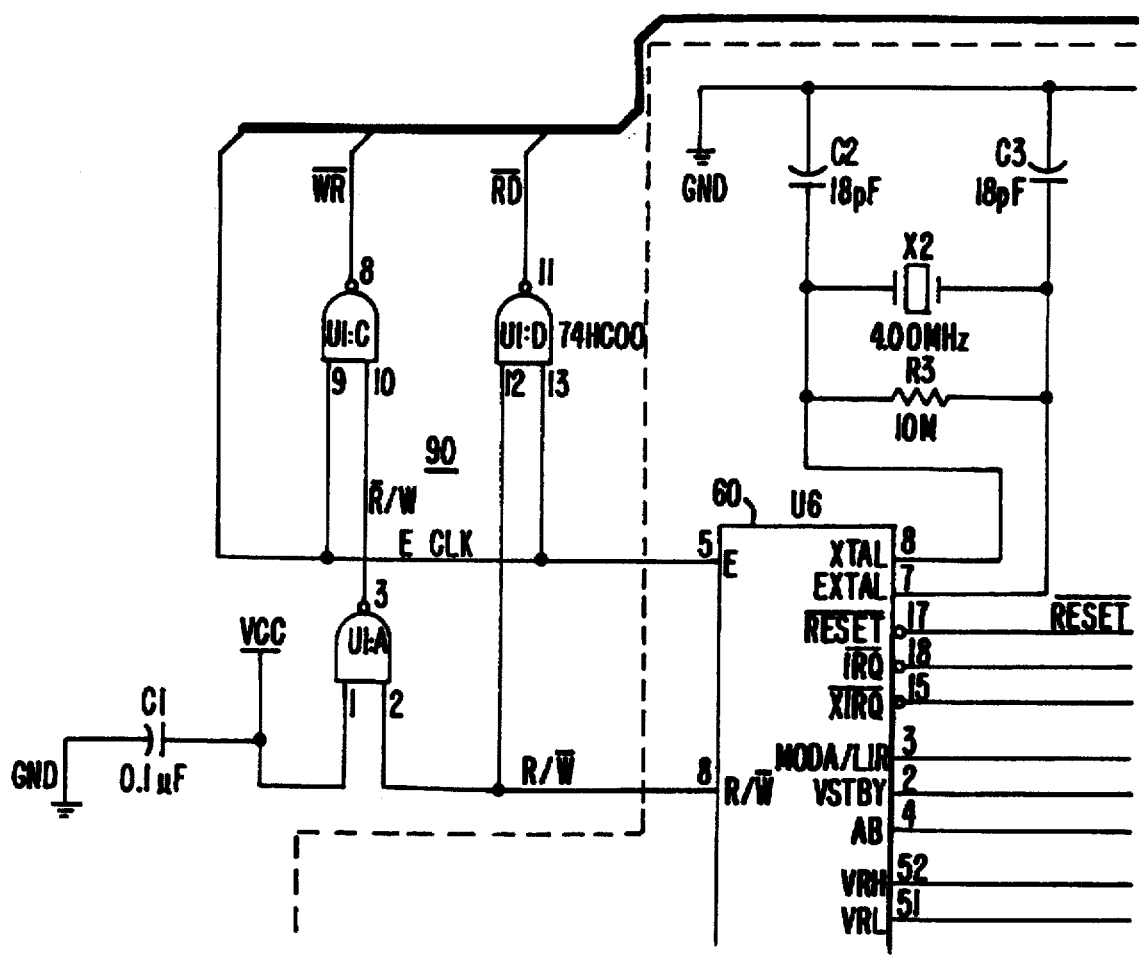
Figures 2, 4A:
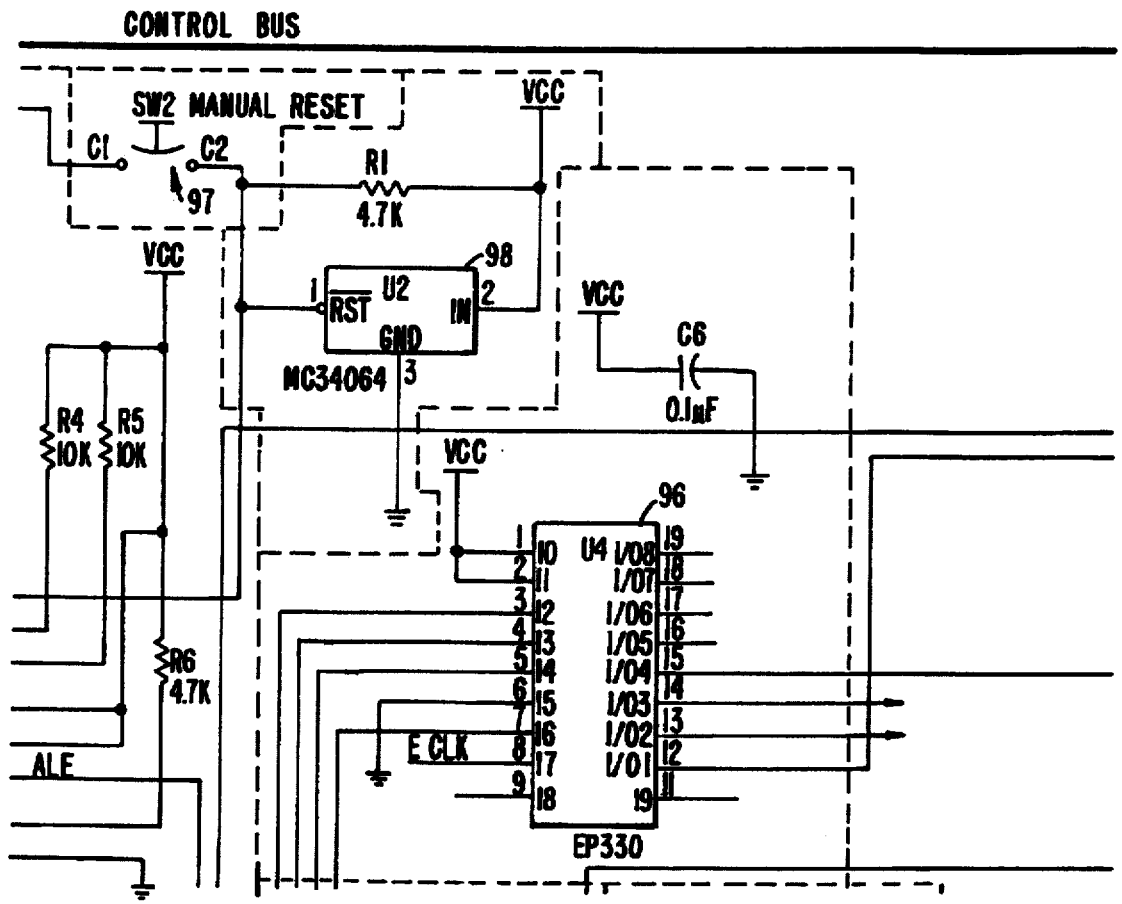
Figures 3, 4A:
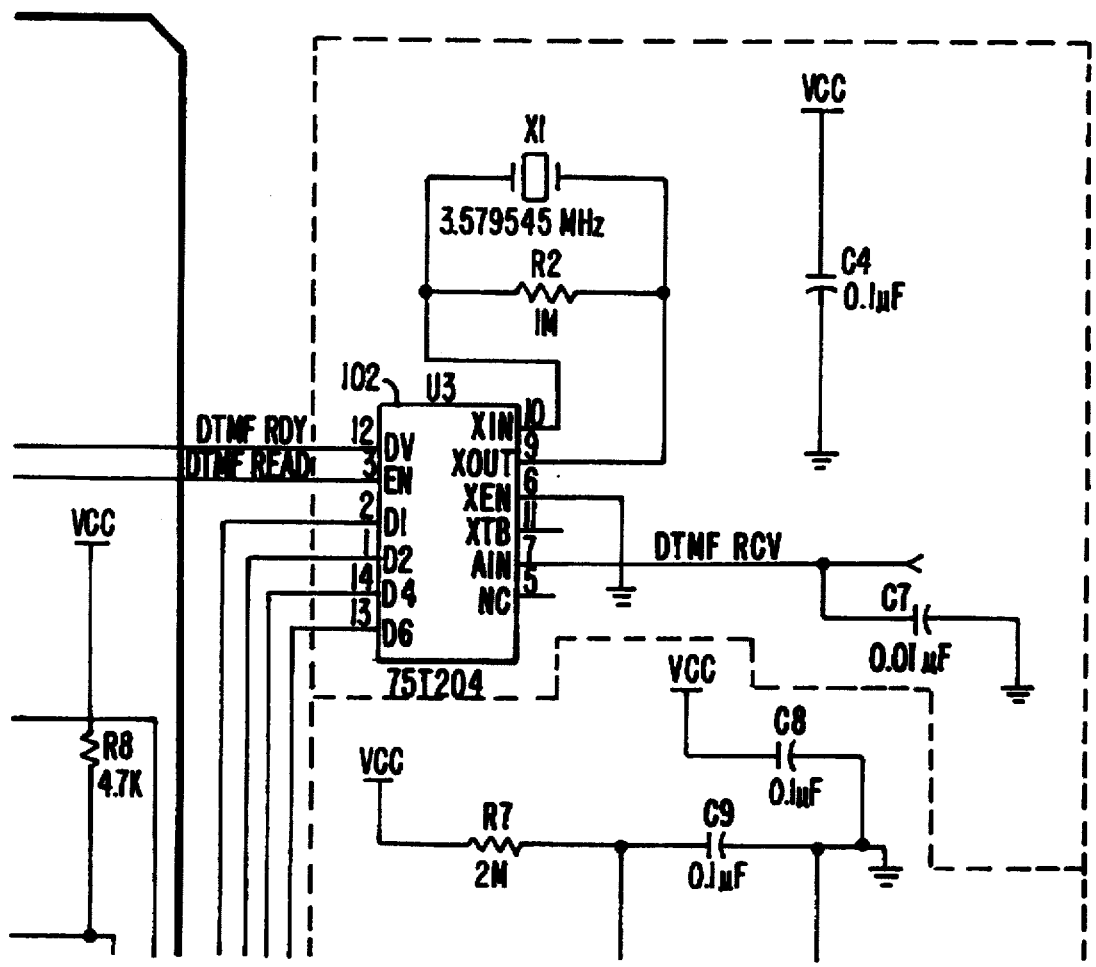
Figures 4, 4A:
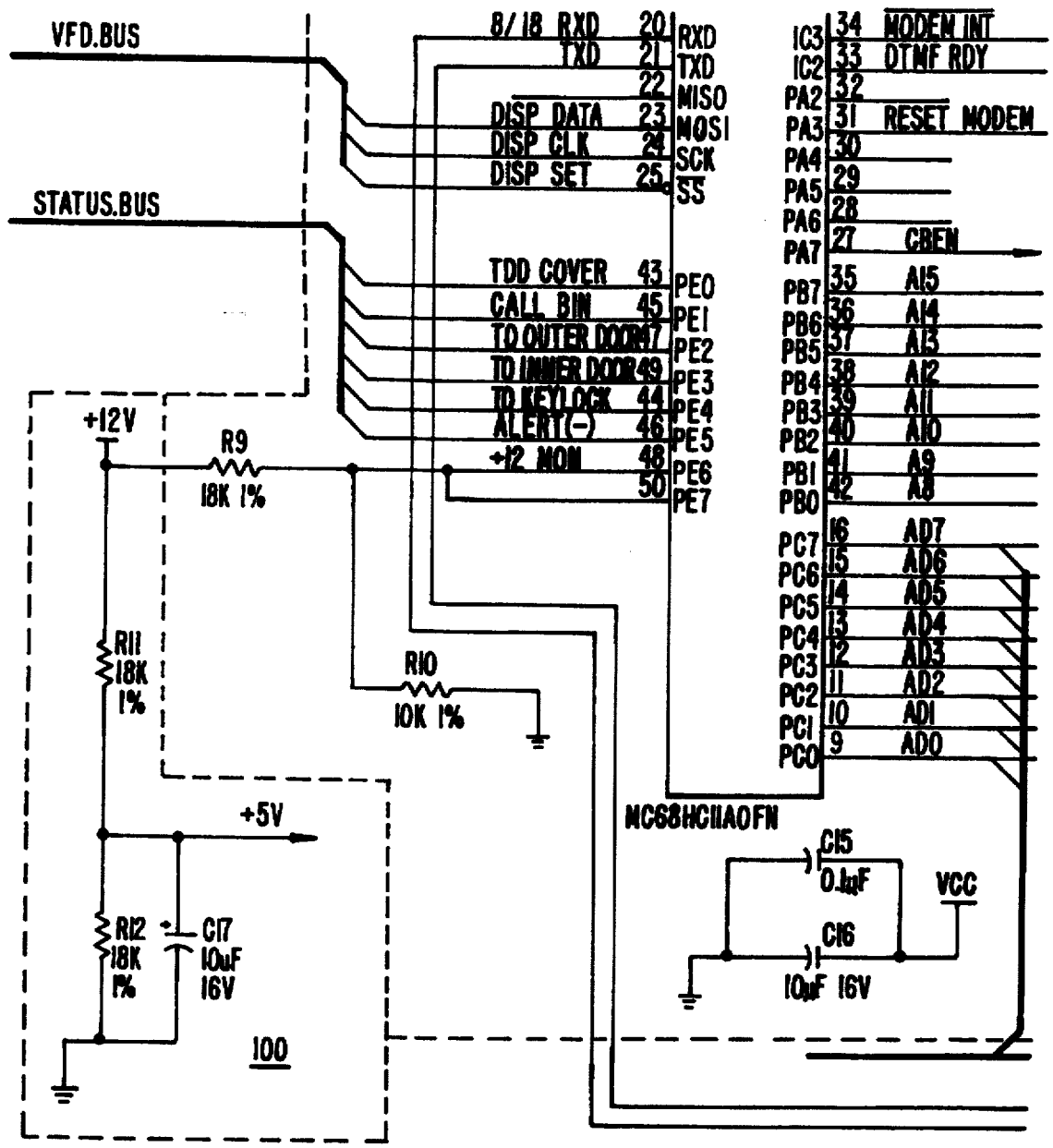
Figures 4, 4A, 5:
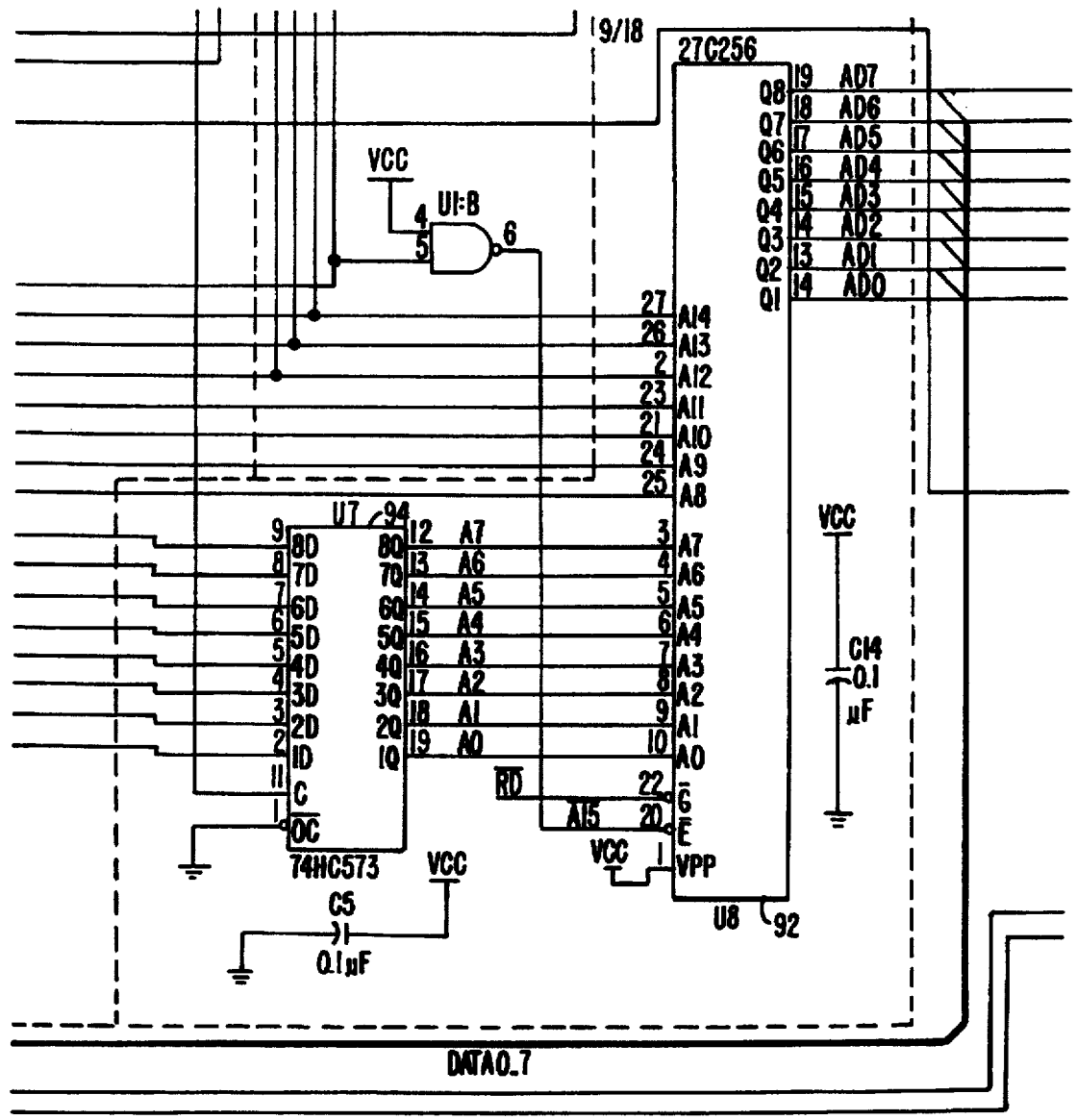
Figures 4, 4A, 5, 6:
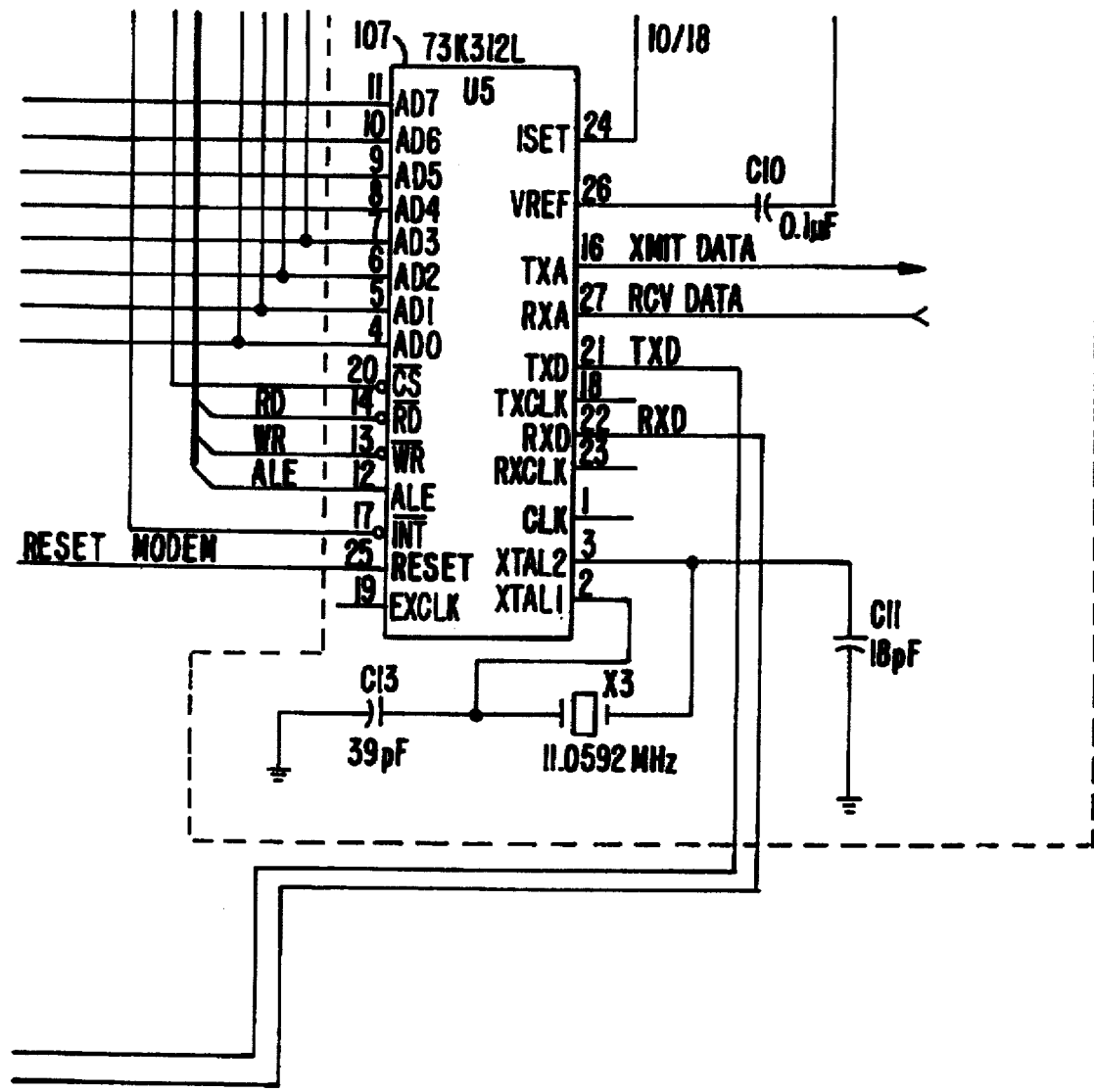
Figures 1, 4B:
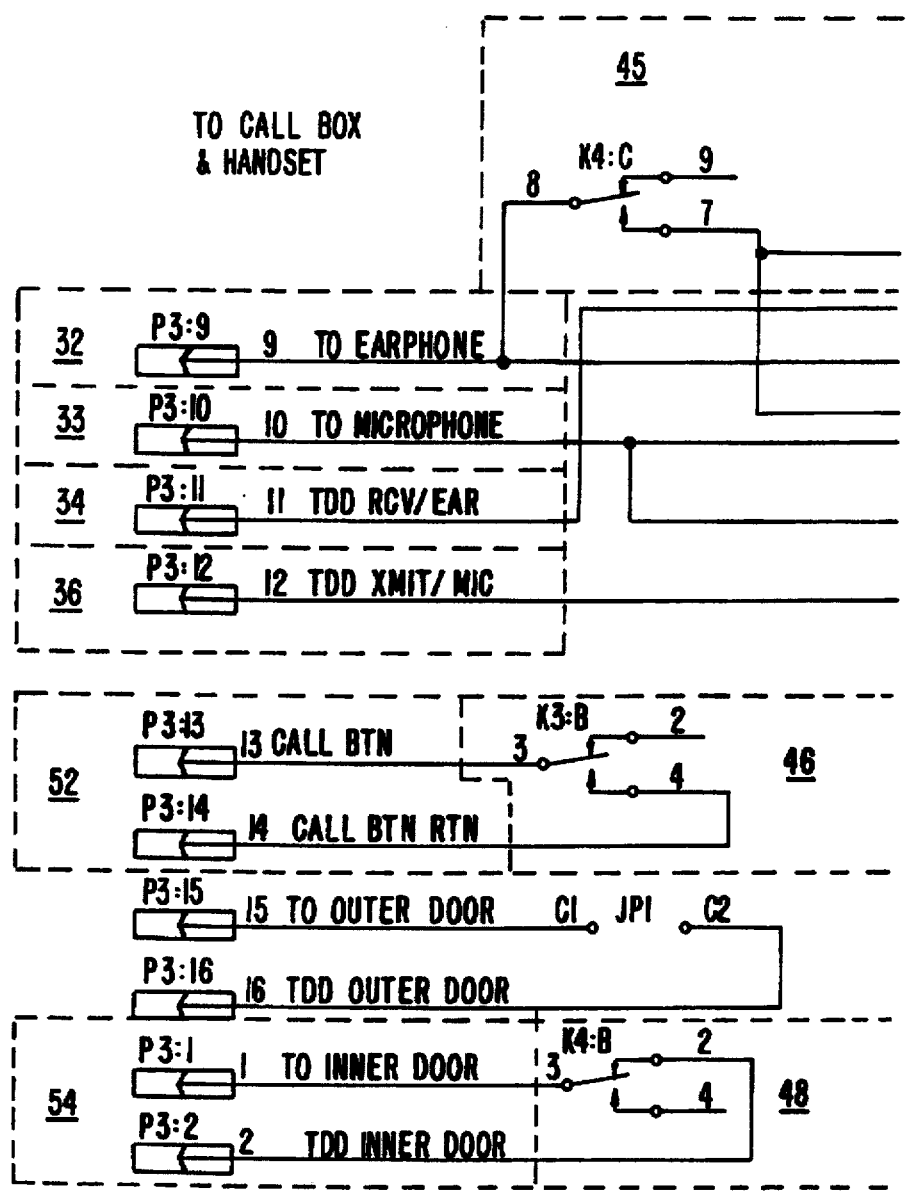
Figures 2, 4B:
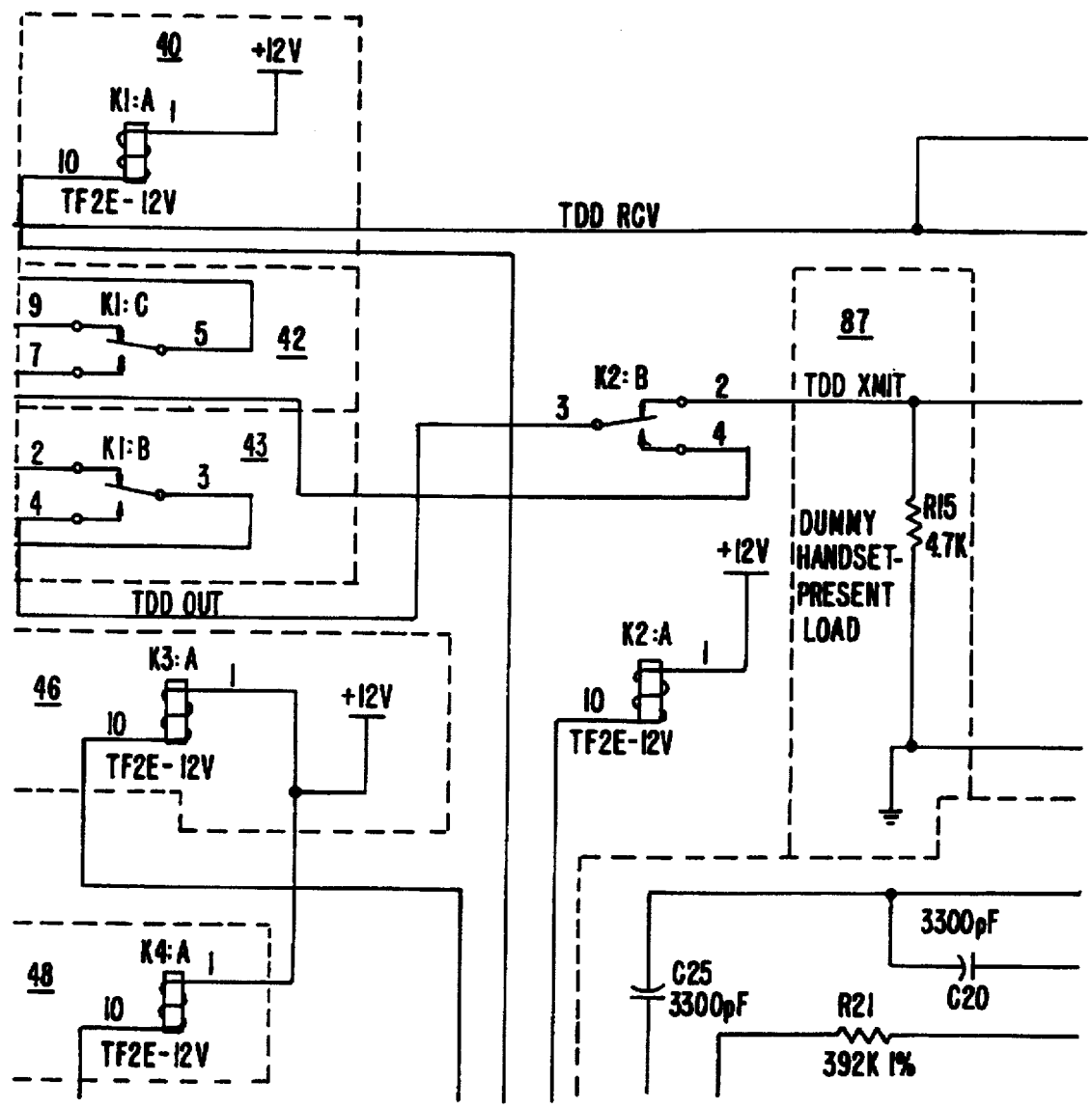
Figures 3, 4B:
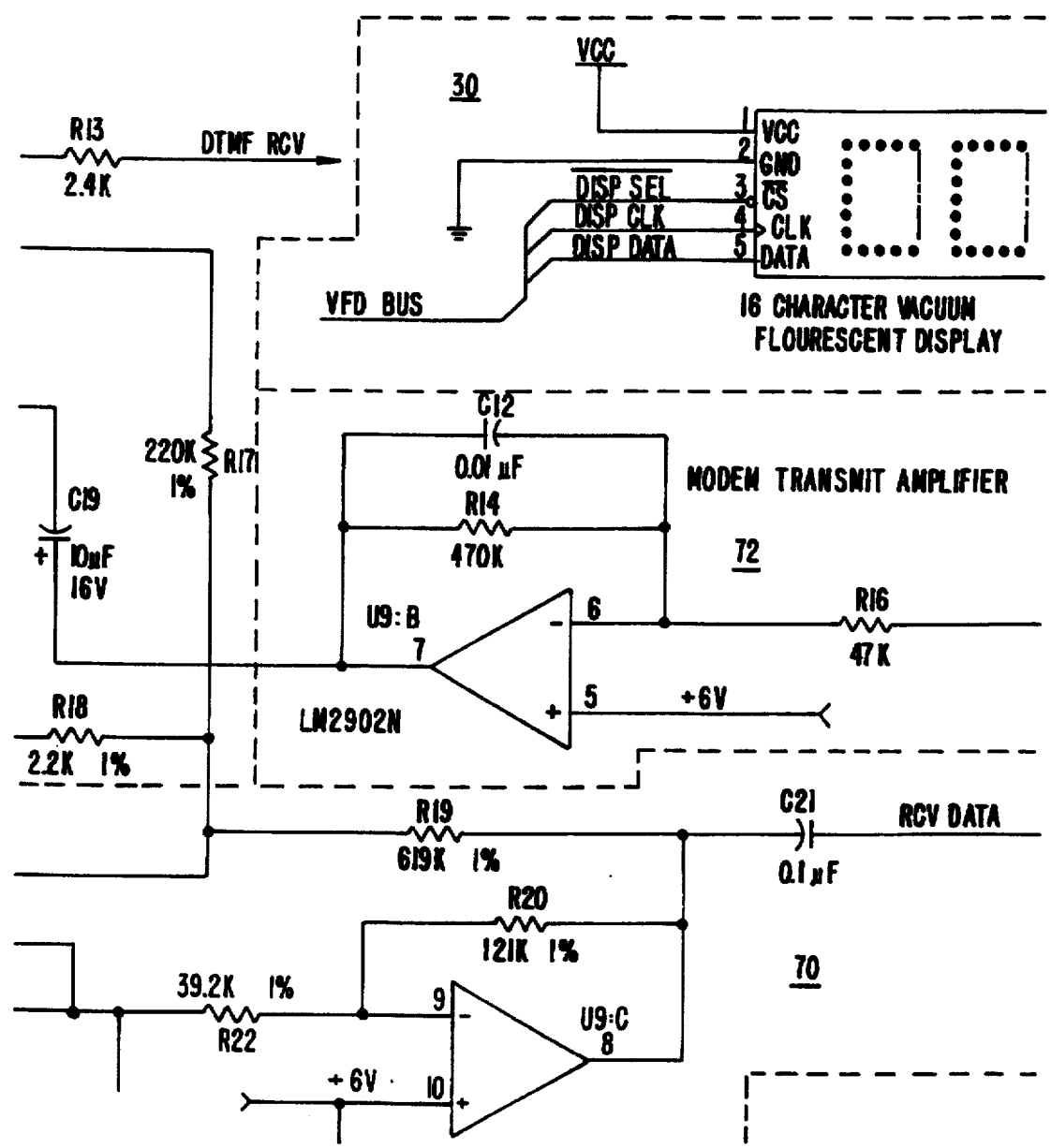
Figures 4, 4B:
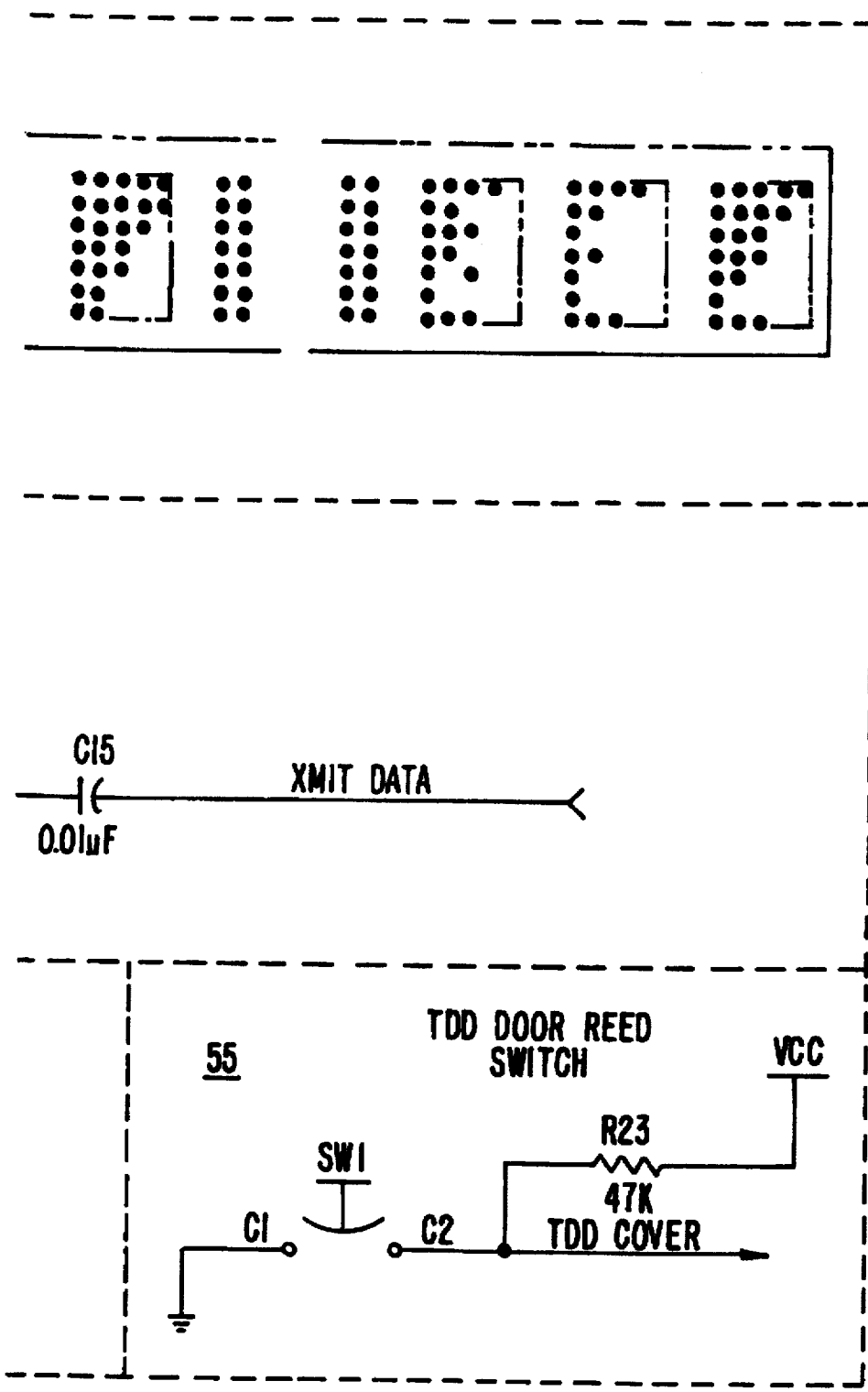
Figures 4, 4B, 5:
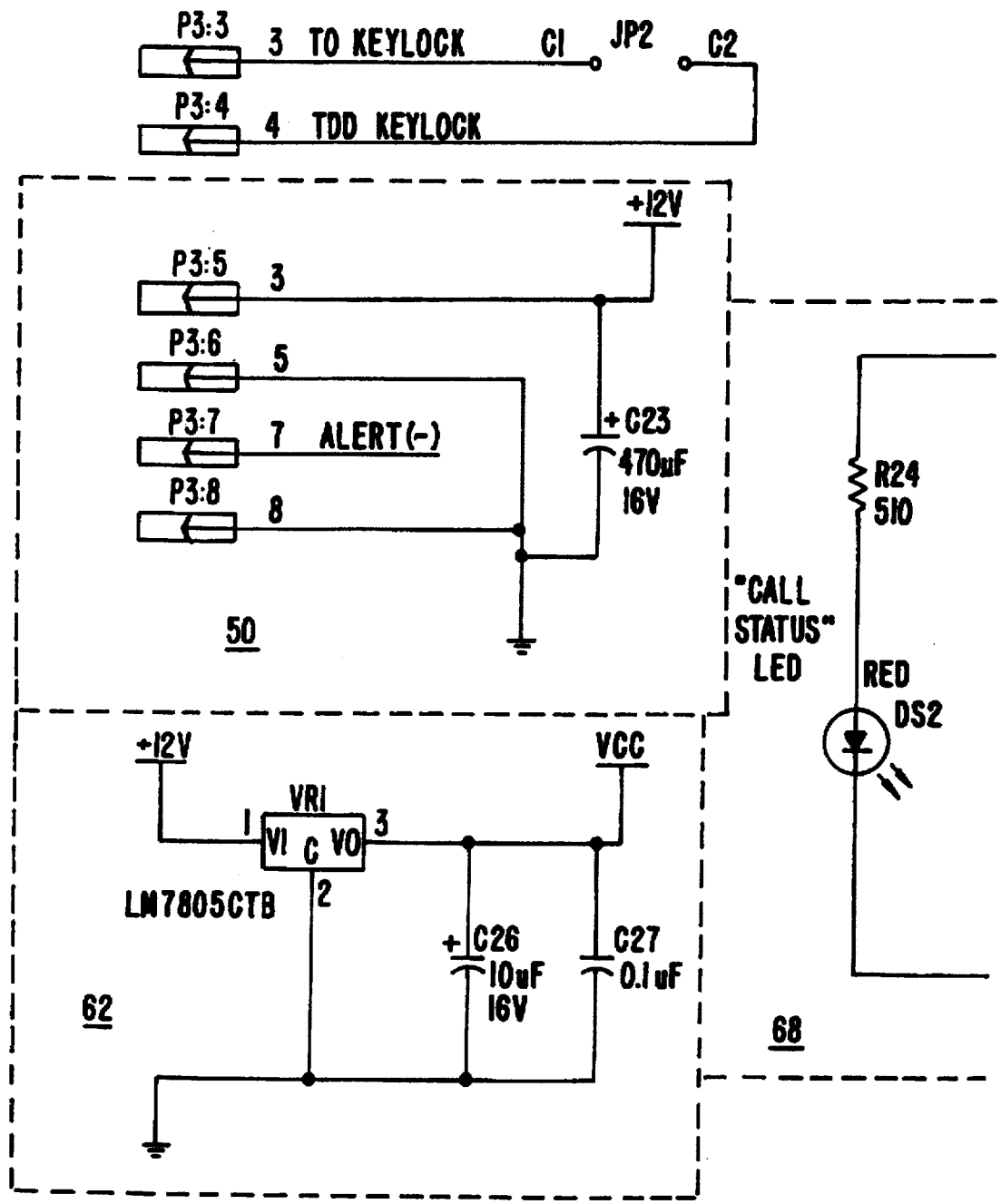
Figures 4, 4B, 5, 6:
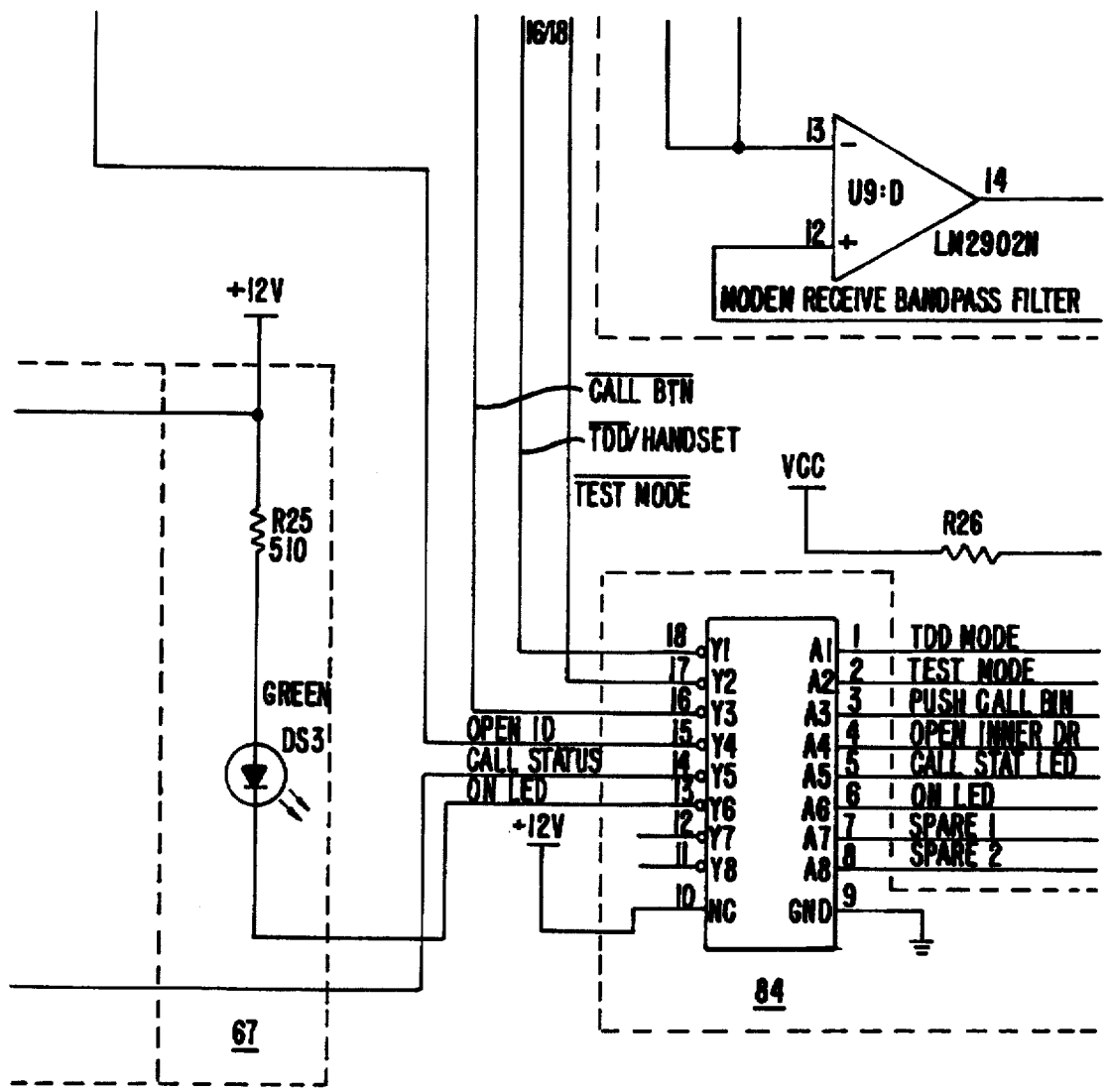
Figures 4, 4B, 5, 6, 7:
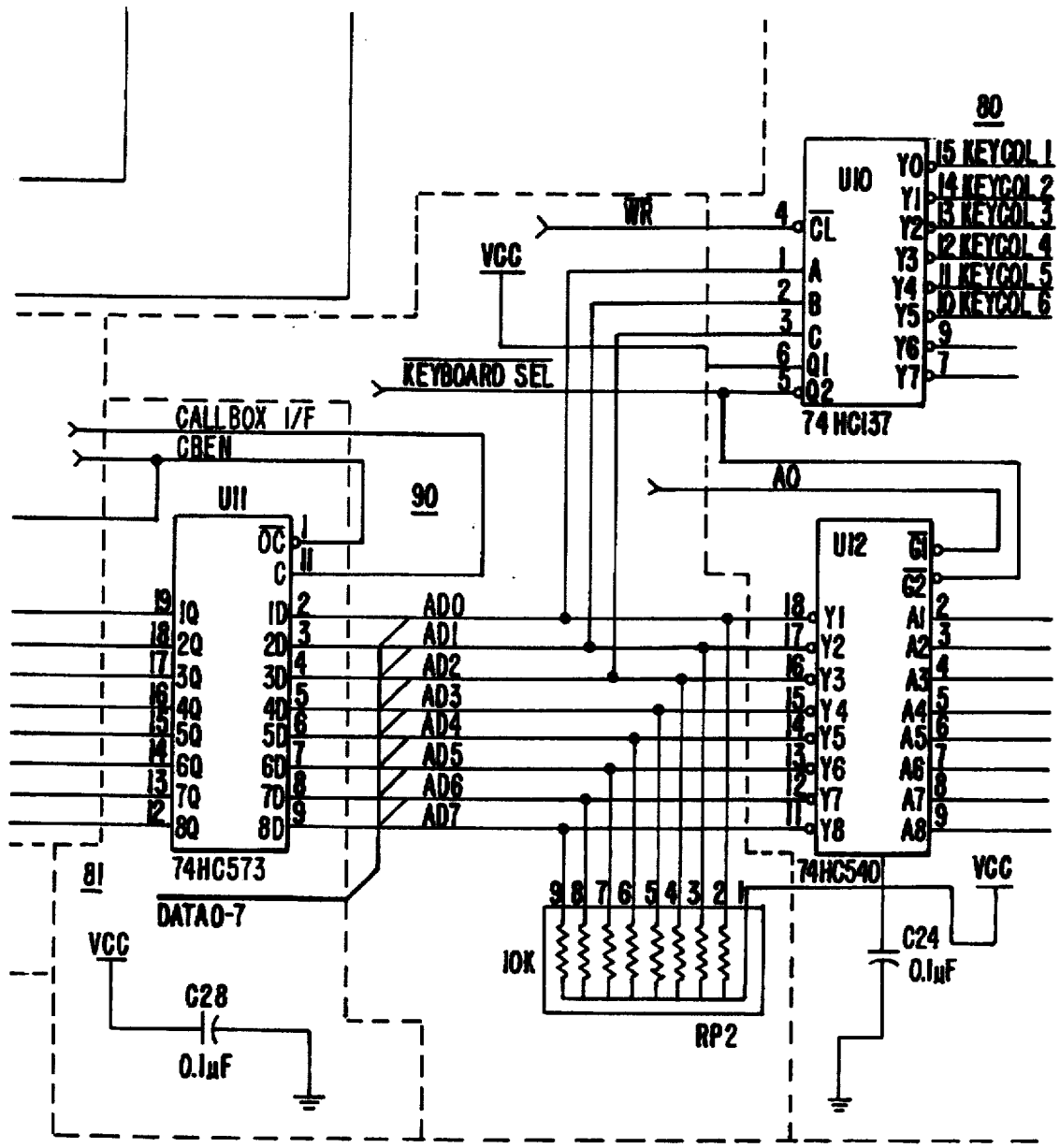
Figures 4, 4B, 5, 6, 7, 8:
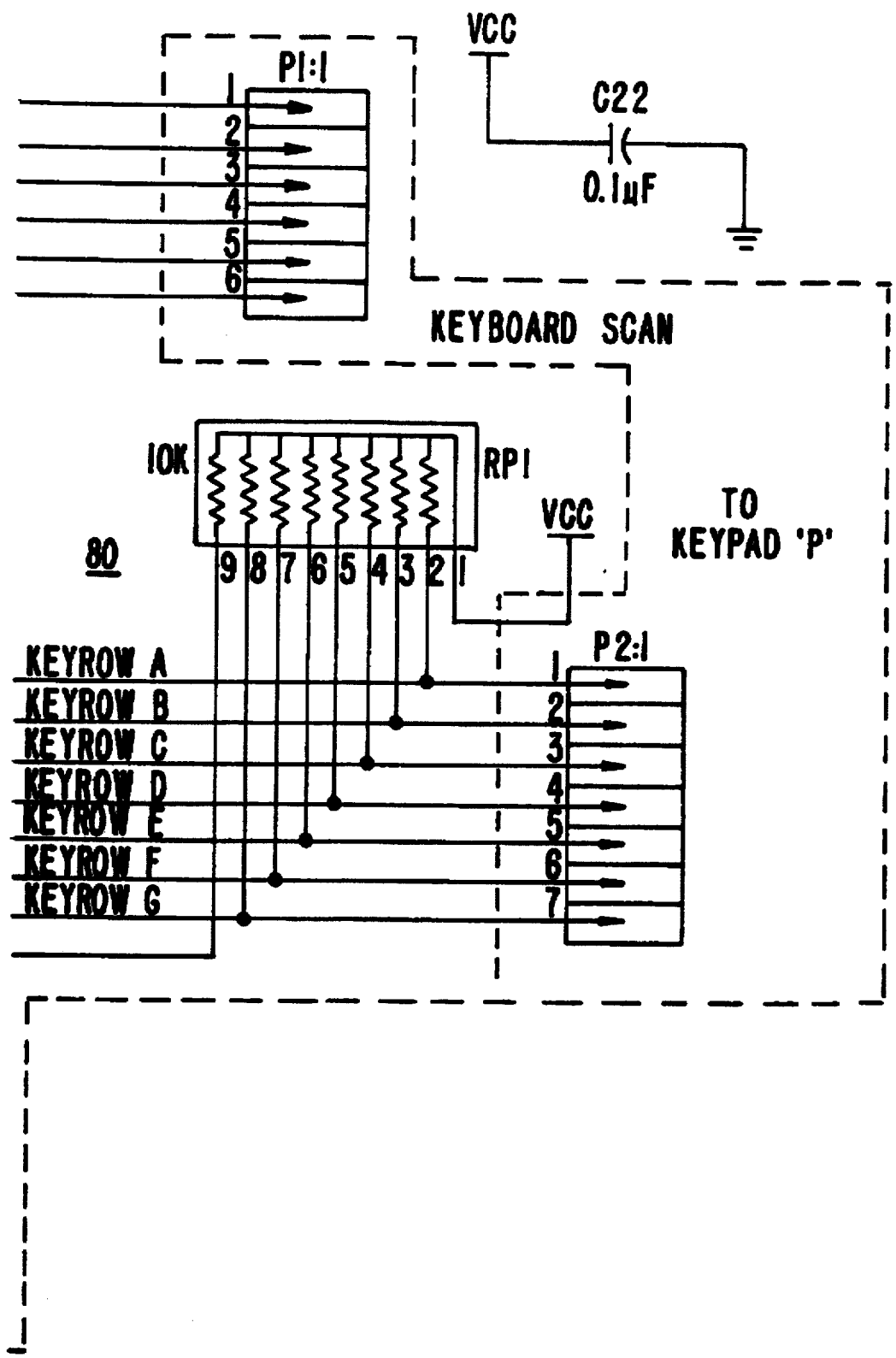

Having summarized the exterior of call box C and keyboard K, attention can now be directed to a circuit schematic as set forth in FIGS. 4A and 4B. Thereafter, overall keyboard function can be described with reference to the flow chart set forth in FIG. 3A and 3B.

Referring to FIGS. 4A and 4B, it will be understood that the TDD keyboard K is essentially an "add on" to a regular call box C. Accordingly, ear phone connection 32 and microphone connection 33 are provided to handset H. Likewise, receiver connection 34 and transmit connection 36 are provided to cellular transceiver T.

It is necessary that switching between handset H and keyboard K occur. Accordingly, switching relay 40 causes ear phone contact 42 and microphone contact 43 to switch the interface into and out of the path from handset H to cellular transceiver T. Thus with the switching connection shown, either handset H is normally connected to call box C or it is disconnected and keyboard K takes the place of handset H.

For ease of service, it is sometimes required that a technician listen to modem transmission from keyboard K. This being the case, ear phone tap relay 45 is actuated to channel sounds of the transmitting modem to the earpiece of handset H. This happens to occur when both stopping keying (SK) key 26 and "ON" switch 21 are simultaneously depressed.

When keyboard communication is selected, off hook relay 46 allows the interface to appear to cellular transceiver T as if the "off hook" condition were present. Inner door alarm relay 48 and inner door input 54 indicates when keyboard is active; it is utilized for both originating an alarm to indicate tampering as well as to provide operation log information that the TDD device was utilized.

Power is derived from input power connections 50. This constitutes a tap to the lamp supply of call box C. Call button or hook switch 52 has call button override relay 46 for activation when keyboard K is active. At the same time, keyboard door $K_D$ is monitored by door state circuit 55 with output to the system microprocessor 60 (See FIG. 4B). This enables power up of fluorescent display 30 and activates the display to identify the function of the keyboard.

The interface of this invention includes power supply 62 for powering the circuit.

It will be understood that the interface includes two inputs and three outputs. The inputs include box door D and QWERTY keypad P. The three outputs include florescent display 30, "ON" status LED 67 and call status LED 68. "ON" status LED 67 indicates the LED is turned on. Call status button 68 is illuminated on all occasions when the normal caller would receive a tone; it has relatively long blinks for ringing, flashes for a busy signal, etc. This provides visual information relating to the progress of the call. This light goes on full time when the call is answered and the location information has been successfully interrogated by the dispatch center equipment.

It will be understood that cellular transceiver T is not the optimum environment for a modem. Accordingly, it is preferable to include filtering for outgoing and incoming signals from keyboard K. Accordingly, incoming filter 70 and outgoing filter 72 are preferably centered around the frequency range preferred by the modem. The incoming filter 70 range is preferably a dual band pass filter from 330 to 600 Hz for call progress tones and the receive carrier at 2225 Hz for modem transmission. It is to be noted that call box modem generates a transmit carrier at 1270 Hz. Likewise line noise and other frequencies are attenuated. It is to be noted that outgoing filter 72 amplifies the transmitted signal as well as applying the applicable filter.

Keypad P is strobed for key closure at conventional matrix keyboard scanning circuitry 80. Interface latch 81 and transistor relay power chip 84 enable power of relays previously set forth.

When STAT K is transmitting, no handset is required. Therefore, handset load emulating resistor 87 is required to provide a "dummy handset load" to assure output of STAT K, without having cellular transceiver T sense that its regular handset is missing.

Referring to FIG. 4A, microprocessor 60 and associated logic 90 is present. It includes program memory 92, address latch 94, programmable gate array 96 which is customized for the application here. Manual reset 97 and power on reset 98 are provide to assure power up from the same device state.

Programmable gate array 96 in the preferred embodiment is simply an address decoder, with the four outputs (two active low, two active high) located at the following addresses:

--Modem Select=2000H

--Keyboard Select=3000H

Callbox Interface=4000H

DTMF Read=5000H

It should be noted that additional logic functions may be included in this programmable device, or the described decoding accomplished with discrete logic or a different topology without affecting the scope of the invention.

Voltage reference circuit 100 is provided for filter reference point which is half way between the supply voltage and ground. This gives amplifiers a reference voltage which allows maximum symmetrical output from the amplifiers of the band pass filtering and transmitting circuitry.

Touch tone decoder chip 102 is used for providing a valid tone interrupt to system microprocessor 60. This allows keyboard K to monitor the ANI (Automatic Number Identification) feature of the call box C to enable identity and necessarily location to be transmitted. Modem chip 107 communicates at outputs 300 BAUD data for send and receive transmission from the unit.

Having set forth a general description of the hardware, attention can now be directed to the flow chart of FIGS. 3A and 3B. It will be understood that the logic present in this table is programmed to memory; since the illustrated components are standard and languages for such programming is well known, only the substance of the program—and not its operational features are set forth.

Referring to FIGS. 3A and 3B, the layout of the tabled information is readily understood.

Before a call, it is presumed that call box C is in a normal, dormant state. Box door D is closed and cellular transceiver T is in sleep state 131. The dispatch center is manned and the display likewise dormant.

When box door D is opened, power up 132 occurs. At this point, a person getting ready to utilize keyboard K has two courses of conduct that he can follow.

First, handset H can be removed from hook switch S, keyboard door $K_D$ opened exposing keypad P and "ON" switch 21 depressed. Second, the same procedure can be followed without removing handset H for hook switch S. In either event, cellular transceiver T will be in the process of placing a call to the dispatch center. In either case the scrolled display will state "This device is for non-voice communication to the Highway Patrol" 171.

Regarding the placing of such a call, call placement without answer 153 will be accompanied by scrolled message "Please wait—Your call is being made—" 172. This will be followed in the usual case by connection to a recording— assuming that dispatch operators are busy. With connection to a recording the display will remain unchanged, but the call status LED 68 will flicker in direct response to the recorded voice—identical to standard TDDs.

Assuming that the queued call is answered at a dispatch center, the first action of the dispatch operator is to ask for the Automatic Number Identify (ANI) function of the call box C. Up until such request, the user is free to toggle between voice communication and the TDD keyboard K. When such a dispatch center request is made, the interface locks to the particular mode selected 134 or 134'—either handset H or keyboard K. This prevents the possible message miscue of having the dispatch center attempt to connect a keyboard while the user in the emergency situation is switching arbitrarily between the handset and keyboard.

Presuming that the user has selected keyboard K, fluorescent display 30 will scroll "Call Answered—Transferring to a TDD dispatcher—please wait" 174. At the same time, the dispatch center operator on hearing carrier modem tones, will in fact be transferring to a TDD device.

When the interface detects a carrier modem tone from the TDD dispatcher 155, keyboard enable 135 will follow. Fluorescent display 30 will state "* On line *." 175.

Thereafter, fluorescent display 30 will echo keys depressed by the user and display messages received from the dispatcher. Most frequently, tree inquiry 156 will be sequentially displayed utilized using pre-determined inquiries with user response 136 utilizing "Yes" key 20 and "No" key 22 to rapidly classify the user's situation. Only when particularity is required, will full key communication be utilized—such as name and address information, or to describe special circumstances regarding the incident or the services required, etc.

The keyboard continuously monitors for a valid connection throughout the call 138. If a dial tone is detected at any point after the initial placement of the call, the call has been lost. The keyboard then terminates the call from the callbox and displays a message stating "Unable to complete your call. Close the TDD door and outer door. Try again in one minute." 179.

This intelligent monitoring ensures that the caller is aware of the call status at all times, and does not wait indefinitely for a lost call to be answered.

At the termination of the emergency communication, disconnection 157 will be made from the dispatch center. Cellular transceiver T will terminate the call with fluorescent display 30 displaying "End of call." 177. Presuming that box door D is closed, cellular transceiver T and its connected interface will return to the "sleep state."

From the foregoing detailed description, it can be seen that the combination of TDD communications to call box C requires interaction between the call box and the TDD keyboard K. This interaction will be understood to be entirely different from the use of more traditional keyboard modems and handset cradles utilized in the prior art. Specifically, interaction between call box C and keyboard K is dependent both on the status of the dispatch center in answering the call as well as the particular state of cellular transceiver T.

What is claimed is:

1. A cellular telephone call box With switching between voice signal and keyboard signal comprising:

a cellular transceiver having an inactive state and an active state for transceiving with a remote station;

a cabinet for containing the cellular transceiver;

a door closing over the cabinet containing the cellular transceiver;

a handset operatively connected to the cellular transceiver;

means connected to the door for activating the cellular transceiver from the inactive state to the active state responsive to opening of the door;

a keyboard device having a keypad switch for activating the keyboard;

a keyboard interface connected between the handset and the cellular transceiver, the keyboard interface responsive to the keypad switch for disconnecting the handset and connecting the keyboard to the cellular transceiver;

a display connected to the keyboard;

first means for causing the display to identify function of the keyboard;

second means responsive to the keypad switch for causing the display announce call status to a user utilizing the keyboard through the display; and, third means for displaying transceiver messages between the cellular transceiver and a remote receiving station.

2. A cellular telephone call box with switching between voice signal and keyboard signal of claim 1 further comprising:

the first means for causing the display to identify the function of the keyboard includes:

a second door over the keyboard inside the cabinet and first door; and, means connected to the second door for causing the function of the keyboard to be displayed on the display responsive to opening of said second door.

3. A cellular telephone call box with switching between voice signal and keyboard signal of claim 1 further comprising:

the second means responsive to the switch for causing the display announce call status to a user includes monitoring of call status of the transceiver; and, a first message for indicating that a call has been placed; and, a second message for indicating that a call has been completed.

4. A cellular telephone call box with switching between voice signal and keyboard signal comprising:

a dispatch center for answering a call of a cellular transceiver;

a cellular transceiver having an inactive state and an active state for placing a call to transceive with the dispatch center;

a cabinet for containing the cellular transceiver;

a door closing over the cabinet containing the cellular transceiver;

a handset operatively connected to the cellular transceiver;

means connected to the door for activating the cellular transceiver from the inactive state to the active state for placing a call to transceive with the dispatch center responsive to opening of the door;

a keyboard having a keypad switch for activating the keyboard;

a keyboard interface connected between the handset and the cellular transceiver, the keyboard interface responsive to the keypad switch for switching the interface alternately between the handset and the keyboard;

means for detecting answering the call of the cellular transceiver by the dispatch center; and, means for deactivating the keypad switch responsive to detected answer by the dispatch center.

5. A cellular telephone call box with switching between voice signal and keyboard signal of claim 4 further comprising:

means in the cellular transceiver for identifying the cellular transceiver to the dispatch center; and, the means for detecting answering the call of the cellular transceiver by the dispatch center operatively connected to the means in the cellular transceiver for identifying the cellular transceiver to the dispatch center to indicate answering of the call.

6. A cellular telephone call box with switching between voice signal and keyboard signal comprising:

a cellular transceiver having an inactive state and an active state for transceiving with a remote station, the cellular transceiver adapted to send and receive touch tone communication;

a cabinet for containing the cellular transceiver;

a door closing over the cabinet containing the cellular transceiver;

a handset operatively connected to the cellular transceiver;

means connected to the door for activating the cellular transceiver from the inactive state to the active state responsive to opening of the door;

a keyboard having a keypad switch for activating the keyboard;

a keyboard interface connected between the handset and the cellular transceiver, the keyboard interface responsive to the keypad switch for disconnecting the handset and connecting the keyboard to the cellular transceiver;

at least one filter connected between the keyboard and cellular transceiver for preferentially receiving signals to the display from the cellular transceiver and preferentially receiving signals to the keyboard from the cellular transceiver.

7. A cellular telephone call box with switching between voice signal and keyboard signal of claim 6 further comprising:

the at least one filter includes a first filter for preferentially passing signals from the keyboard and a second filter for preferentially passing the touch tone communication to and from the cellular transceiver.

* * * * *